(12) United States Patent
Hunger

(10) Patent No.: US 8,884,611 B2
(45) Date of Patent: Nov. 11, 2014

(54) ANGLE SENSOR AND METHOD FOR DETERMINING AN ANGLE BETWEEN A SENSOR SYSTEM AND A MAGNETIC FIELD

(75) Inventor: Norbert Hunger, Freiburg (DE)

(73) Assignee: Micronas GmbH, Freiburg I.Br. (DE)

( * ) Notice: Subject to any disclaimer, the term of this patent is extended or adjusted under 35 U.S.C. 154(b) by 448 days.

(21) Appl. No.: 13/019,772

(22) Filed: Feb. 2, 2011

(65) Prior Publication Data

US 2011/0187351 A1 Aug. 4, 2011

(30) Foreign Application Priority Data

Feb. 3, 2010 (EP) .................................... 10001102

(51) Int. Cl.
*G01B 7/14* (2006.01)
*G01B 7/30* (2006.01)
*H02K 11/00* (2006.01)
*H01L 27/22* (2006.01)
*G01D 5/14* (2006.01)

(52) U.S. Cl.
CPC ..................................... G01D 5/145 (2013.01)
USPC .............. 324/207.2; 324/207.22; 324/207.24; 324/207.25; 310/68 B; 257/427

(58) Field of Classification Search
CPC .... G01R 33/093; G01R 33/00; G01R 33/072; G01D 5/147
USPC ........................................ 324/207.2; 257/427
See application file for complete search history.

(56) References Cited

U.S. PATENT DOCUMENTS

| | | | | |
|---|---|---|---|---|
| 4,810,967 A | * | 3/1989 | Yokoyama et al. | ........ 324/207.2 |
| 5,532,681 A | * | 7/1996 | Peters et al. | ............... 340/573.1 |
| 5,633,546 A | * | 5/1997 | Horst | ........................... 310/68 B |
| 5,880,586 A | * | 3/1999 | Dukart et al. | ............... 324/207.2 |
| 5,946,813 A | * | 9/1999 | Nachbaur et al. | ................ 33/357 |
| 6,049,182 A | * | 4/2000 | Nakatani et al. | ............... 318/432 |
| 6,356,076 B1 | * | 3/2002 | Luetzow | .................. 324/207.25 |

(Continued)

FOREIGN PATENT DOCUMENTS

| | | |
|---|---|---|
| CN | 101253389 A | 8/2008 |
| CN | 101400971 A | 4/2009 |
| WO | WO 2007/077389 A2 | 7/2007 |

OTHER PUBLICATIONS

Chinese Office Action for Application No. 201100560116.0 dated Jan. 28, 2013 with English translation.

*Primary Examiner* — Jermele M Hollington
*Assistant Examiner* — Christopher McAndrew
(74) *Attorney, Agent, or Firm* — Muncy, Geissler, Olds & Lowe, P.C.

(57) ABSTRACT

An angle sensor for determining an angle between a sensor system and a magnetic field has a magnet which generates the magnetic field and is adjustable in different rotational positions relative to the sensor system with regard to a rotation axis. The sensor system has a first magnetic field sensor for detecting a first magnetic field component oriented transversely to the rotation axis and a second magnetic field sensor for detecting a second magnetic field component, which is situated transversely to a plane extending from the rotation axis and the first magnetic field component. A third magnetic field sensor of the sensor system detects a third magnetic field component, which is oriented in the direction of the rotation axis. The sensor system is positioned relative to the magnet in such a way that the third magnetic field component is largely independent of the rotational position.

18 Claims, 7 Drawing Sheets

(56) References Cited

U.S. PATENT DOCUMENTS

| | | | |
|---|---|---|---|
| 6,433,536 B1* | 8/2002 | Yundt et al. | 324/207.22 |
| 6,545,462 B2* | 4/2003 | Schott et al. | 324/207.2 |
| 6,693,422 B2* | 2/2004 | Lutz | 324/207.2 |
| 6,982,699 B1* | 1/2006 | Lenssen et al. | 345/157 |
| 7,219,547 B2* | 5/2007 | Suzuki | 73/504.04 |
| 7,304,473 B2* | 12/2007 | Kuroyanagi et al. | 324/207.25 |
| 7,307,414 B2* | 12/2007 | Ito et al. | 324/174 |
| 7,323,864 B2* | 1/2008 | Teulings et al. | 324/207.2 |
| 7,511,484 B2* | 3/2009 | Oohira et al. | 324/251 |
| 7,560,919 B2* | 7/2009 | Hatanaka et al. | 324/207.25 |
| 7,561,051 B1* | 7/2009 | Kynor et al. | 340/572.6 |
| 7,567,078 B2* | 7/2009 | Takahashi et al. | 324/207.25 |
| 7,808,234 B2 | 10/2010 | Kurihara | |
| 7,855,569 B2* | 12/2010 | Natsuhara et al. | 324/750.05 |
| 7,868,610 B2* | 1/2011 | Velinsky et al. | 324/207.25 |
| 7,898,245 B2* | 3/2011 | Arinaga et al. | 324/207.25 |
| 7,982,456 B2* | 7/2011 | Kawano et al. | 324/207.25 |
| 8,148,977 B2* | 4/2012 | Ramaswamy et al. | 324/244 |
| 8,203,329 B2* | 6/2012 | Hohe et al. | 324/202 |
| 2002/0167310 A1* | 11/2002 | Wallner et al. | 324/207.25 |
| 2003/0033116 A1* | 2/2003 | Brcka et al. | 702/182 |
| 2005/0275399 A1 | 12/2005 | Kitanaka et al. | |
| 2005/0288576 A1* | 12/2005 | Fegert et al. | 600/425 |
| 2007/0016007 A1* | 1/2007 | Govari et al. | 600/424 |
| 2007/0181391 A1* | 8/2007 | St. Clair et al. | 188/267 |
| 2007/0267709 A1* | 11/2007 | Oohira | 257/427 |
| 2007/0297780 A1* | 12/2007 | Enomoto | 396/55 |
| 2008/0145041 A1* | 6/2008 | Enomoto | 396/53 |
| 2009/0203992 A1* | 8/2009 | Govari et al. | 600/424 |
| 2009/0219016 A1 | 9/2009 | Debrailly | |
| 2009/0278531 A1* | 11/2009 | Franke et al. | 324/207.2 |

* cited by examiner

US 8,884,611 B2

ANGLE SENSOR AND METHOD FOR DETERMINING AN ANGLE BETWEEN A SENSOR SYSTEM AND A MAGNETIC FIELD

This nonprovisional application claims priority under 35 U.S.C. §119(a) to European Patent Application No. EP 10001102.2-1236, which was filed on Feb. 3, 2010, and which is herein incorporated by reference.

BACKGROUND OF THE INVENTION

1. Field of the Invention

The present invention relates to an angle sensor for determining an angle between a sensor system and a magnetic field, comprising a magnet which generates the magnetic field and is adjustable in different rotational positions relative to the sensor system with regard to a rotation axis, the sensor system having a first magnetic field sensor for detecting a first magnetic field component which is oriented transversely to the rotation axis, and having a second magnetic field sensor for detecting a second magnetic field component which is situated transversely to a plane extending from the rotation axis and the first magnetic field component. The invention also relates to a method for determining an angle between a sensor system and a magnetic field which is rotatable around a rotation axis relative to the sensor system, the sensor system being provided and the magnetic field being generated, the sensor system having a first measured value for a first magnetic field component which is oriented transversely to the rotation axis and a second measured value for detecting a second magnetic field component which is situated transversely to a plane extending from the rotation axis and the first magnetic field component, and the angle between the sensor system and the magnetic field being determined with the aid of the measured values.

2. Description of the Background Art

And angle sensor and a method are known from practice. The angle transmitter has a magnetic disk which is mounted on a holder in a manner which allows it to rotate around a rotation axis and which is situated concentrically to the rotation axis. On its circumference, the magnetic disk has magnetic poles which are offset from each other in the circumferential direction. A semiconductor chip, whose chip plane is oriented normally to the rotation axis and parallel to the plane of the magnetic disk, is situated next to or beneath the magnetic disk in the direction of the rotation axis. Two magnetic field sensors, whose measuring axes lie on the chip plane and are offset from each other by 90°, are integrated into the semiconductor chip. The magnetic field sensors are used to measure magnetic field components for the x and y components of a point on the magnetic field which is located on or adjacent to the rotation axis. An evaluation apparatus, which ascertains the angle between the sensor system and the magnetic field from the magnetic field components thus obtained, using an arcus tangens function, and which generates a corresponding angle measuring signal, is integrated into the semiconductor chip. The angle sensor has the disadvantage that a deviation between the measuring point of the sensor system and the rotation axis of the magnetic field may occur due to mechanical tolerances and/or tolerances in the magnetization of the magnet. As a result, non-linear measurement errors may occur during the angle measurement.

SUMMARY OF THE INVENTION

It is therefore an object of the present invention to provide an angle sensor of the type mentioned above, which may be easily adjusted during mounting of the sensor system on the magnet in such a way that it enables a high degree of measuring accuracy. The object also is to provide a method of the type mentioned above which easily permits a measurement of the angle between a sensor system and the magnetic field.

This object is achieved with regard to the angle sensor in that the sensor system has a third magnetic field sensor for detecting a third magnetic field component oriented in the direction of the rotation axis.

The third magnetic field sensor advantageously makes it possible to measure the magnetic field component which faces in the direction of the rotation axis during mounting of the angle sensor and to position the sensor system relative to the magnetic field in such a way that the third magnetic field component facing in the direction of the rotation axis is largely constant during a rotational movement of the magnet or the magnetic field. The sensor system is then positioned precisely on the magnetic rotation axis and thus symmetrically to the magnetic field. The angle sensor adjusted in this manner permits a high degree of measuring accuracy.

In an embodiment of the invention, the sensor system is integrated into a semiconductor substrate, the first magnetic field sensor and the second magnetic field sensor each having at least one vertical Hall plate situated transversely to the plane of the semiconductor substrate, and the third magnetic field sensor having at least one horizontal Hall plate situated parallel to the plane of the semiconductor substrate or situated on the plane of the semiconductor substrate. Through these means, the magnetic field sensors may be cost-effectively integrated into the semiconductor substrate. Complex flux conducting bodies which deflect the magnetic flux are avoided.

It is advantageous if the surface center of gravity of the at least one vertical Hall plate of the first magnetic field sensor coincides with the surface center of gravity of the at least one vertical Hall plate of the second magnetic field sensor. The first and second magnetic field components may then be measured at the same measuring site.

In an embodiment of the invention, the vertical Hall plate of the first magnetic field sensor penetrates the vertical Hall plate of the second magnetic field sensor. Only a relatively small chip area is needed for the two Hall plates.

In an embodiment of the invention, the surface center of gravity of the horizontal Hall plate and the surface center of gravity of the vertical Hall plate of the first magnetic field sensor and/or of the second magnetic field sensor lie on top of each other if the extension plane of the semiconductor substrate is viewed from above. Through these means, the angle sensor permits an even greater measuring accuracy.

It is advantageous if the third magnetic field sensor has an analog measuring signal output for the third magnetic field component, if a temperature sensor having an analog temperature signal output is situated on the semiconductor chip, and if the measuring signal output and the temperature signal output are optionally or alternately connectable to an input of an analog/digital converter via a switching device. The analog/digital converter may thus be used to digitize the third magnetic field component and the temperature signal. A digital output of the analog/digital converter may be connected to a digital signal processor stage for further processing the measuring signals. With the aid of the temperature signal, the temperature dependency of the measuring signals may be compensated or weakened for the magnetic field components.

In an embodiment of the invention, the magnet is mounted via a bearing in a manner which enables it to rotate around the rotation axis relative to the sensor system, an adjusting apparatus which enables the rotation axis to be adjusted relative to the sensor system in the direction of the first magnetic field component and in the direction of the second magnetic field component being situated between the bearing and the sensor system. The adjusting apparatus makes it possible to easily position the sensor system on the magnetic rotation axis of the magnetic field when the angle sensor is mounted. If necessary, the adjusting apparatus may have an additional positioning axis, with the aid of which the magnet is adjustable relative to the sensor system in the direction of the third magnetic field component. However, it is also possible, of course, to provide an adjusting apparatus on a production line and to fix the sensor system on a holder for the magnet after positioning the sensor system in the correct position on the magnet.

With regard to the method of the type mentioned above, the aforementioned object is achieved in that: a) a measuring signal for a third magnetic field component oriented in the direction of the rotation axis is detected as a function of the rotational position; b) the fluctuation in the measuring signal is ascertained and compared with a setpoint value or a setpoint value range; c) in the event that the fluctuation does not match the setpoint value or the setpoint value range, i) the sensor system is moved relative to the magnetic field transversely to the rotation axis; ii) and steps a) through c) are then repeated; d) and in the event that the fluctuation matches the setpoint value or the setpoint value range, the first and second measured values are detected, and the angle between the sensor system and the magnetic field is determined with the aid of the measured values.

A fluctuation can be understood to mean to be a difference between the maximum and minimum values of the measuring signal. The invention is based on the finding that the third magnetic field component remains constant during rotation of the magnetic field around a rotation axis if the third magnetic field sensor, and thus the sensor system, is situated on the rotation axis. If the fluctuation in the third magnetic field component occurring during the rotational motion lies outside the preset setpoint value range or if it does not match the preset setpoint value, the sensor system is moved transversely to the rotation axis and relative thereto until the fluctuation lies within the setpoint value range or matches the setpoint value, and the measuring point of the sensor system is thus approached on the rotation axis up to a permissible tolerance.

In an embodiment of the method, a first measuring signal for the third magnetic field component is detected as a function of the rotational position, and the fluctuation in the first measuring signal is ascertained, when the rotation axis and the sensor system are situated in a first relative position. In a first direction, the sensor system is positioned relative to the rotation axis and placed in a further relative position. A further measuring signal for the third magnetic field component is detected as a function of the rotational position, and the fluctuation of this measuring signal is ascertained, for the further relative position. The change between the fluctuation in the measuring signal last detected and the fluctuation in the previously detected measuring signal is determined. The last three steps being repeated until the change in the fluctuation changes its sign, and the aforementioned steps being then carried out in such a way that the movement takes place in a second direction which is oriented at right angles to the first direction and at right angles to the rotation axis.

The sensor system is thus oriented relative to the magnetic rotation axis initially in the first direction and then in the second direction. This permits fast and accurate positioning of the sensor system on the rotation axis.

The first magnetic field component and the second magnetic field component preferably lie on a plane situated normally to the rotation axis and are oriented at right angles to each other. The magnetic field components then correspond to the axes of a Cartesian coordinate system. This permits easy and fast adjustment of the angle sensor. The angle may also be ascertained from the first and second magnetic field components by forming the arcus tangens from the quotient of the first and second magnetic field components and/or with the aid of the so-called CORDIC algorithm, using relatively little computational effort.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
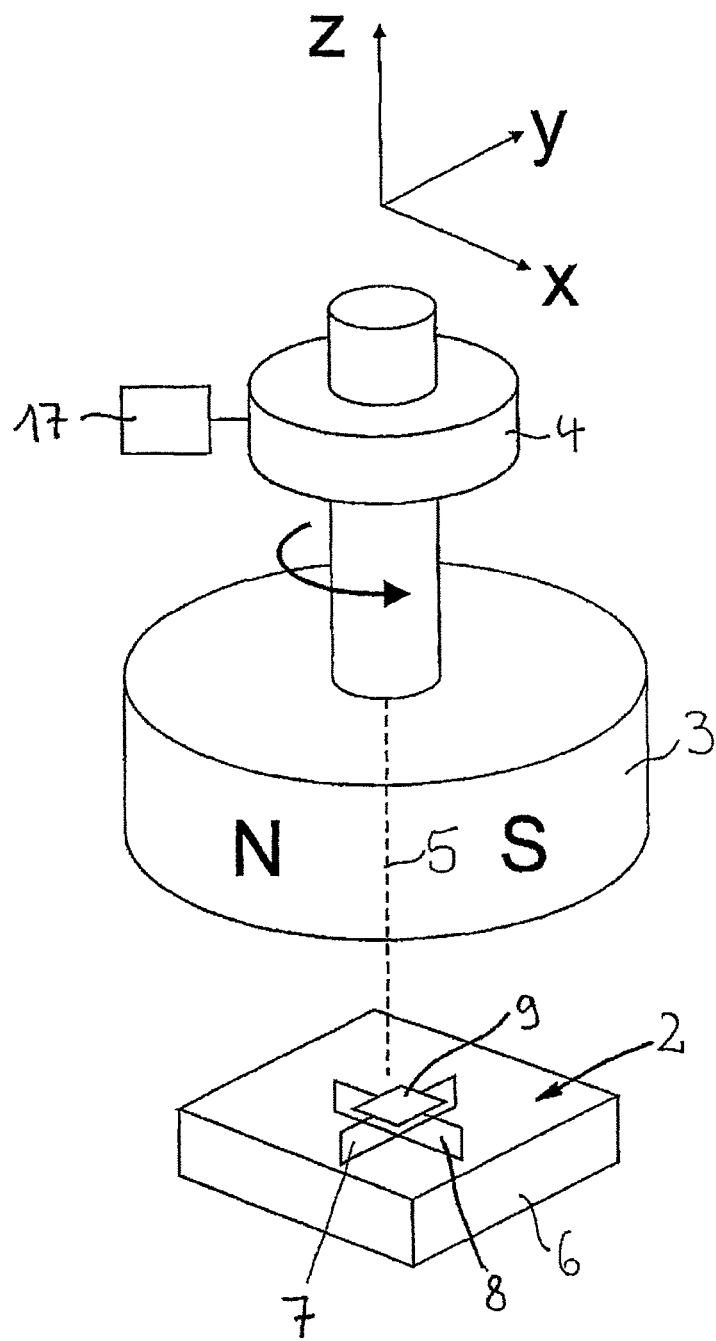
FIG. 1 shows an angle sensor for determining an angle between a sensor system integrated into a semiconductor chip and a magnetic field which is rotatable around a rotation axis, the measuring point of the sensor system being situated on the side at a distance from the rotation axis.
Figure 1:

An angle sensor identified as a whole by reference numeral 1 for determining an angle between a sensor system 2 and a magnetic field has a disk-shaped magnet 3 for generating the magnetic field. Magnet 3 is mounted with the aid of a bearing 4 in a manner which enables it to rotate around a mechanical rotation axis 5. FIG. 1 shows that rotation axis 5 coincides with the z axis of a Cartesian coordinate system.

Magnet 3 is magnetized at right angles to rotation axis 5 and has a north pole and a south pole on its circumference which are offset from each other by 180° with regard to rotation axis 5. Due to production tolerances, the axis of symmetry of the magnetic field is positioned on the side at some distance from rotation axis 5.

However, other embodiments of magnet 3 are also conceivable in which the magnet has multiple pole pairs on its circumference. In this case, north poles and south poles alternate with each other in the circumferential direction.

To measure the magnetic field, sensor system 2 has a semiconductor chip including a semiconductor substrate 6, into which magnetic field sensors 7, 8, 9 are integrated. A first magnetic field sensor 7 is sensitive to a magnetic field component oriented in the x direction of the coordinate system. A second magnetic field sensor 8 is sensitive to a second magnetic field component oriented in the y direction of the coordinate system, and a third magnetic field sensor 9 is sensitive to a third magnetic field component oriented in the z direction of the coordinate system. The first and second magnetic field components are situated at right angles to each other and at right angles to mechanical rotation axis 5.

As shown in FIG. 1, first magnetic field sensor 7 and second magnetic field sensor 8 each have a vertical Hall plate. The Hall plates are rotated relative to each other by 180° with regard to the normals on the extension plane of semiconductor substrate 6 and penetrate each other at the center. It is also conceivable for the vertical Hall plates to be situated on top of each other in the z direction and to intersect each other in the center. The vertical Hall plates may also have two or more plate elements which are situated on a plane and are positioned at a distance from each other radially to rotation axis 5.

Third magnetic field sensor 9 has a horizontal Hall plate which is situated above the vertical Hall plate. The surface center of gravity of the horizontal Hall plate is situated on or in a straight extension of the section line of the vertical Hall plates.

Figure 2:
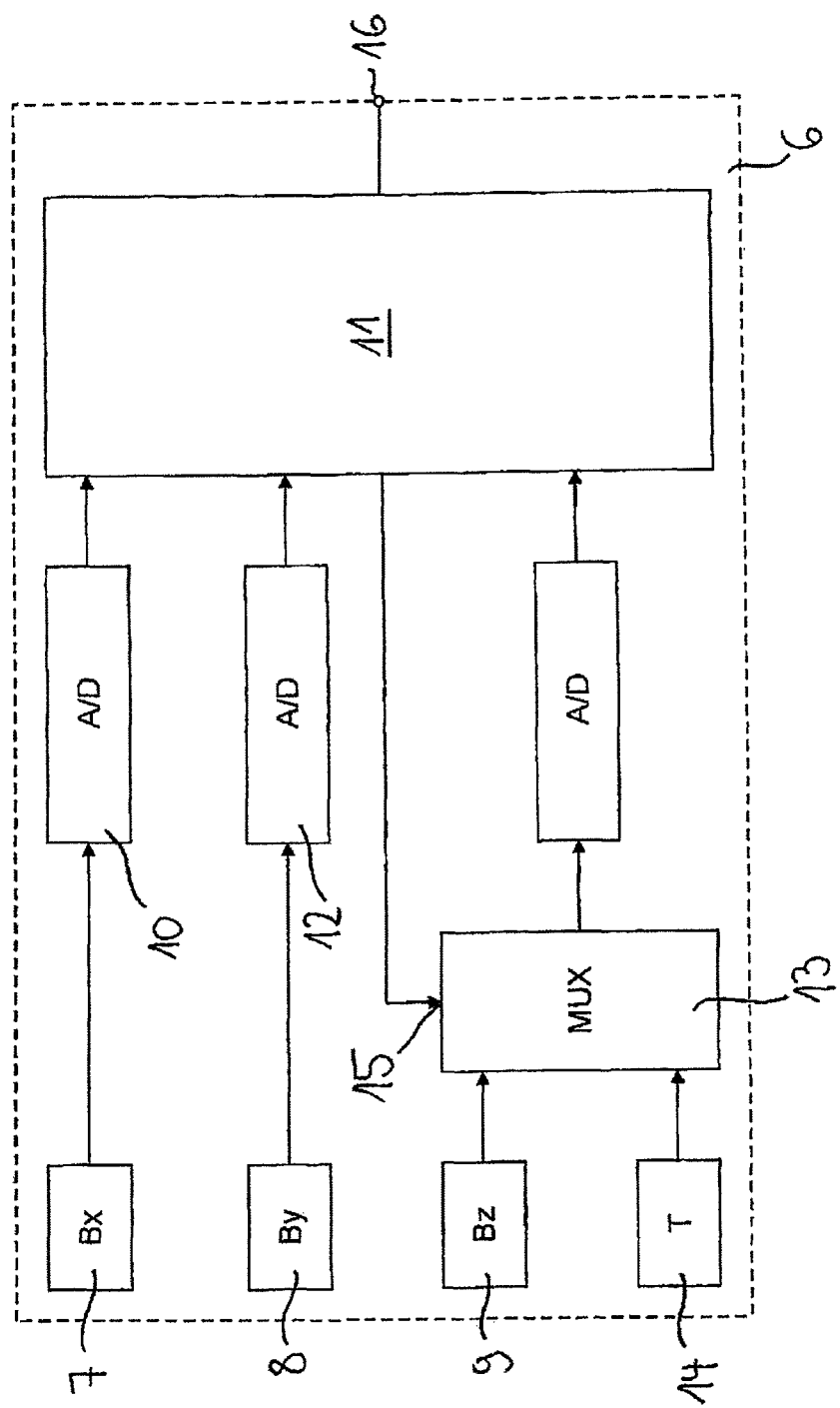
FIG. 2 shows a block diagram of a circuit integrated into the semiconductor chip.

According to FIG. 2, first magnetic field sensor 7 has a first measuring signal output which is connected to a first digital input of a signal processor 11 via a first analog/digital converter 10. Correspondingly, second magnetic field sensor 8 has a second measuring signal output, which is connected to a second digital input of signal processor 11 via a second analog/digital converter 12.

Third magnetic field sensor 9 has a third measuring signal output which is connected to a first input of a switching device 13. A temperature signal output of a temperature sensor 14, which is integrated into semiconductor substrate 6, is connected to a second input of switching device 13. An output connection of switching device 13 is connected to a third digital input of signal processor 11. The measuring signal output of third magnetic field sensor 9 and the temperature signal output of temperature sensor 14 may be alternately connected to the third digital input of signal processor 11 with the aid of switching device 13. The appropriate input is selected via an addressing signal, which signal processor 11 applies to an address signal input 15 of switching device 13 via an address line.

An adjusting apparatus 17, with the aid of which rotation axis 5 is adjustable relative to sensor system 2 at least in the direction of the first magnetic field component and in the direction of the second magnetic field component, is situated between bearing 4 and the sensor system.

In manufacturing angle sensor 1, sensor system 2 is positioned in the magnetic field of magnet 3 with the aid of a holder, which is not illustrated in further detail in the drawing, in such a way that the measuring point of sensor system 2 is located on a predetermined side of the magnetic rotation axis and at a distance therefrom (FIG. 1). The magnetic rotation axis may deviate slightly from mechanical rotation axis 5, due to mounting and/or magnetization tolerances and, in particular, it may be located parallel thereto and offset therefrom.

Figure 3:
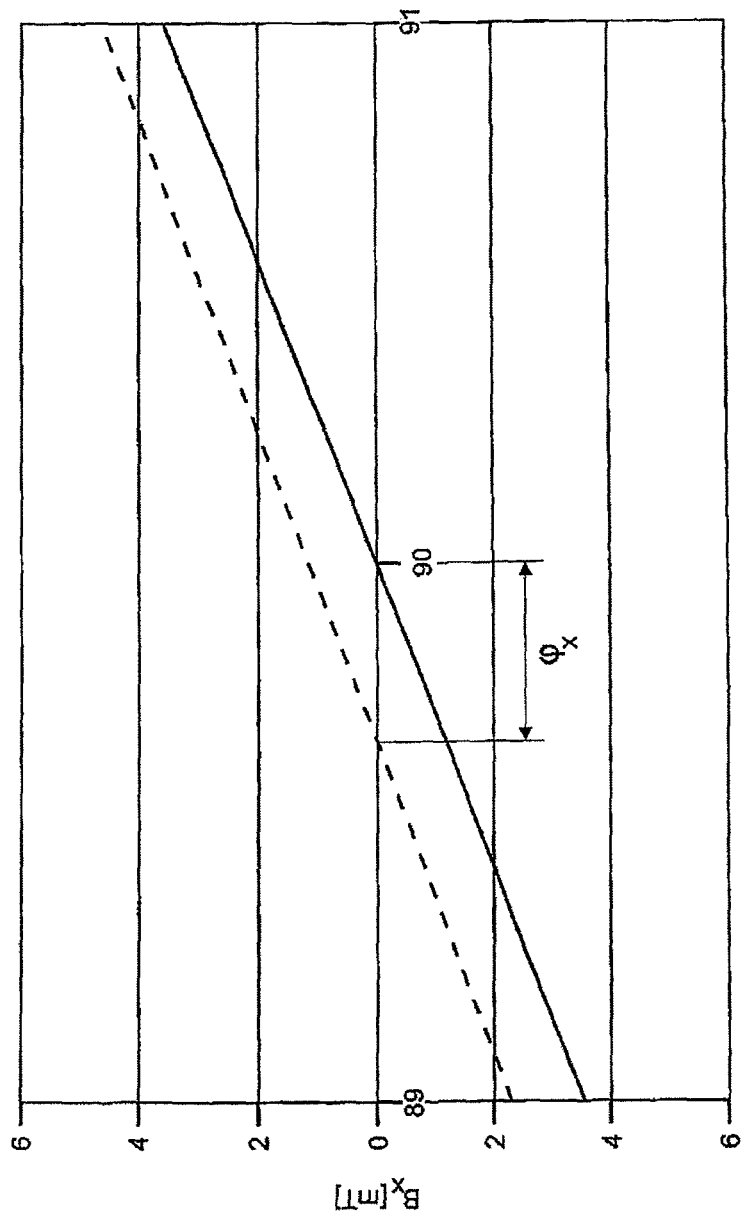
FIG. 3 shows measuring signals of a magnetic field sensor of the sensor system which is sensitive to the x component of the magnetic field, the angle being plotted in degrees on the abscissa and the measured x component of the $B_x$ magnetic field being plotted in millitesla on the ordinate.
Figure 4:
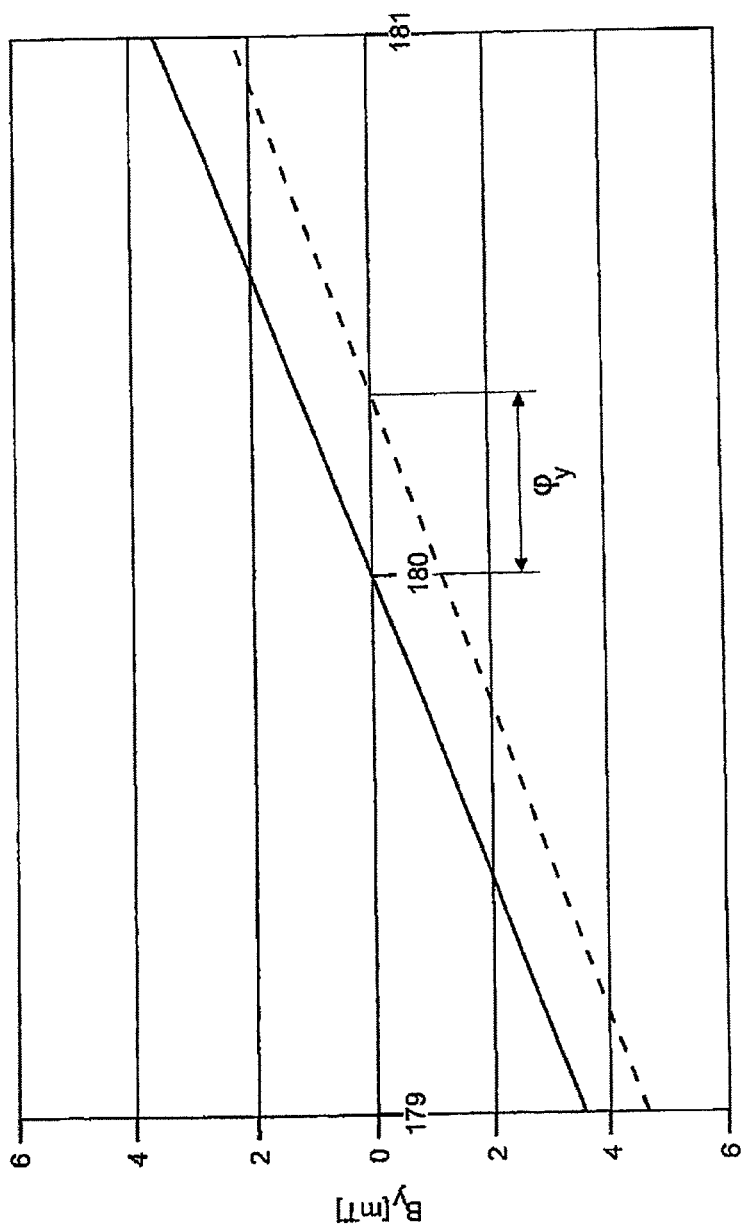
FIG. 4 shows measuring signals of a magnetic field sensor of the sensor system which is sensitive to the y component of the magnetic field, the angle between the sensor system and the magnetic field being plotted in degrees on the abscissa and the measured y component of the $B_y$ magnetic field being plotted in millitesla on the ordinate.

As shown in FIGS. 3 and 4, phase errors $\phi_x$ and $\phi_y$ of the largely sinusoidal and cosinusoidal measuring signals occur in the first and second magnetic field components, due to this incorrect positioning of sensor system 2. In FIG. 3, the measuring signal of the first magnetic field component, which has the phase error, is shown as a broken line, and the corresponding error-free measuring signal is shown as a solid line. Correspondingly, FIG. 4 shows phase error $\phi_y$ for the second magnetic field component. Amplitude errors, which are not addressed in further detail in FIGS. 3 and 4, are added to these phase errors.

Figure 5:
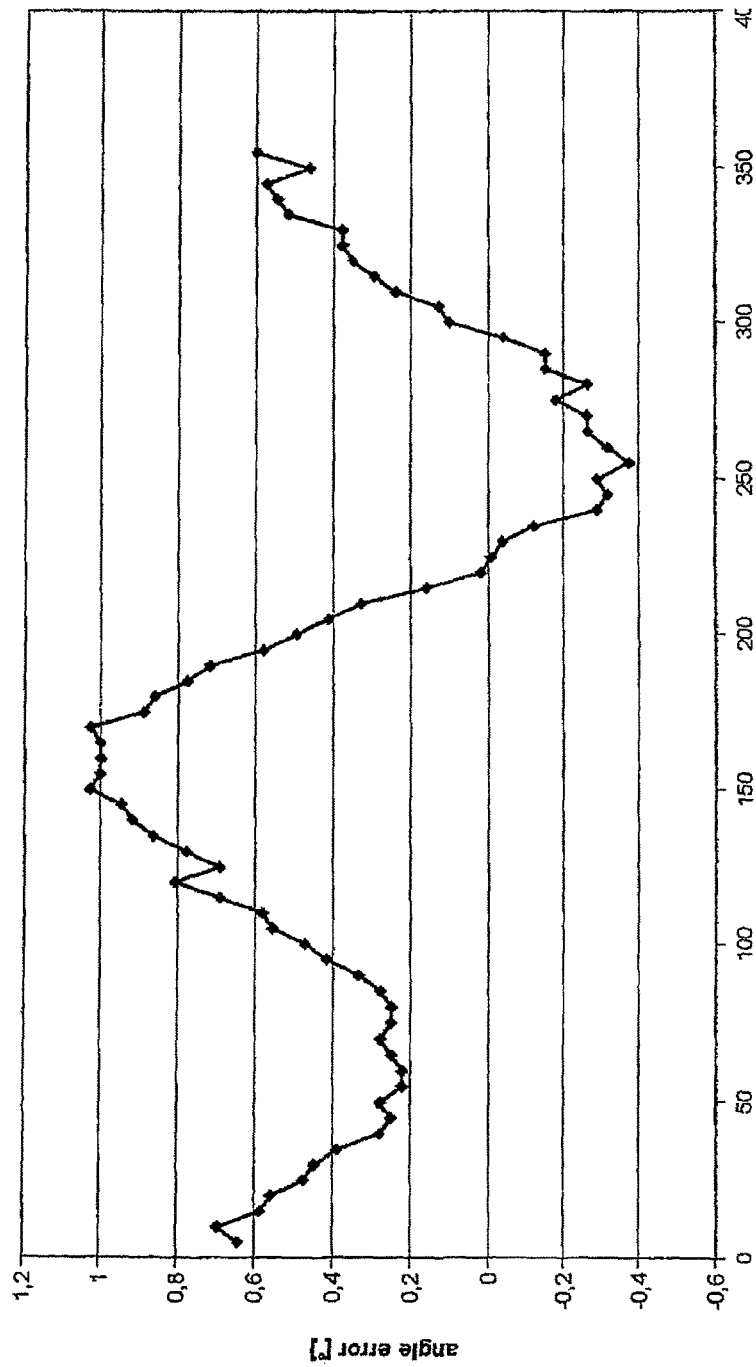
FIG. 5 shows a graphical representation of an angle error in the measuring signal of the angle sensor, which occurs when the measuring point of the sensor system is situated at a radial distance from the rotation axis of the magnetic field.

If the angle between sensor system 2 and the magnetic field were to be determined from the faulty magnetic field component with the aid of an arcus tangens operation or with the aid of the CORDIC algorithm, the angle signal would have a non-linear angle error, as shown by way of example in FIG. 5.

To avoid such an angle error, the position of sensor system 2 relative to the magnetic rotation axis is adjusted before carrying out the actual angle measurement. This adjustment is preferably made during mounting of angle sensor 1. However, the adjustment may also be carried out at a later point in time, or it may be repeated.

In a first method step, a first measuring signal for the third magnetic field component oriented in the direction of rotation axis 5 is detected as a function of the rotational position in the relative position in which sensor system 2 was previously placed. For this purpose, magnet 3 is placed into rotational motion around rotation axis 5, while the third magnetic field component is measured and plotted. The fluctuation in the first measuring signal is then ascertained by calculating the difference between the maximum and minimum values of the measuring signal. If necessary, the first measuring signal may be first filtered to smooth out or remove any interference contained therein.

In a second method step, sensor system 2 is moved toward rotation axis 5 in a first direction and placed in a further relative position.

In a third method step, a further measuring signal for the third magnetic field component is detected as a function of the rotational position for the further relative position. In a manner corresponding to the first measuring signal, the fluctuation is ascertained for the further measuring signal.

In a fourth method step, the change between the fluctuation in the measuring signal last detected and the fluctuation in the previously detected, first measuring signal is determined.

In a fifth method step, method steps two through four are repeated until the change in the fluctuation in the measuring signals changes its sign or is equal to zero, retaining the direction in which sensor system 2 is moved relative to the magnetic rotation axis.

Figure 6:
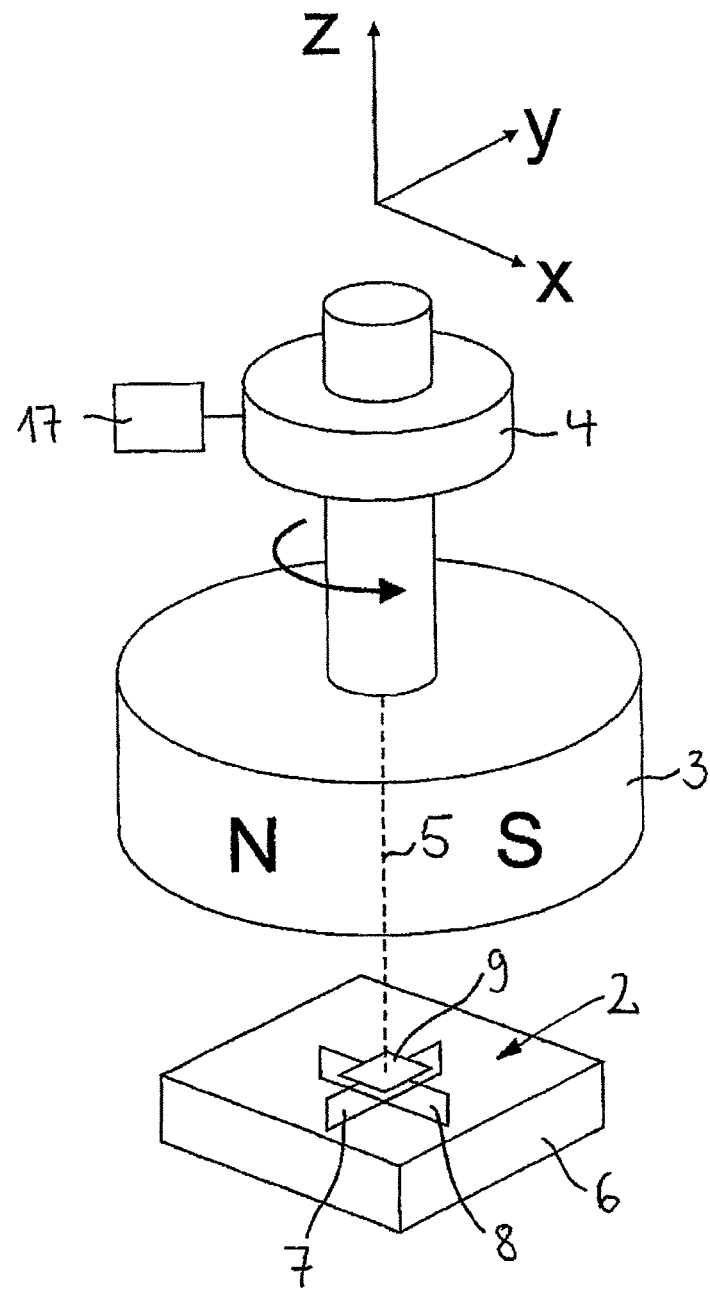
FIG. 6 shows a representation similar to FIG. 1, however, the measuring point of the sensor system being situated on the magnetic rotation axis.

Based on the relative position thus obtained, method steps one through five are correspondingly repeated, however sensor system 2 in method step two is moved toward the rotation axis in a second direction which runs at right angles to the first direction and at right angles to rotation axis 5. When the change in the fluctuation in the measuring signals changes its sign or is equal to zero in method step five, the measuring point of sensor system 2 is located on or closely adjacent to the magnetic rotation axis (FIG. 6).

Figure 7:
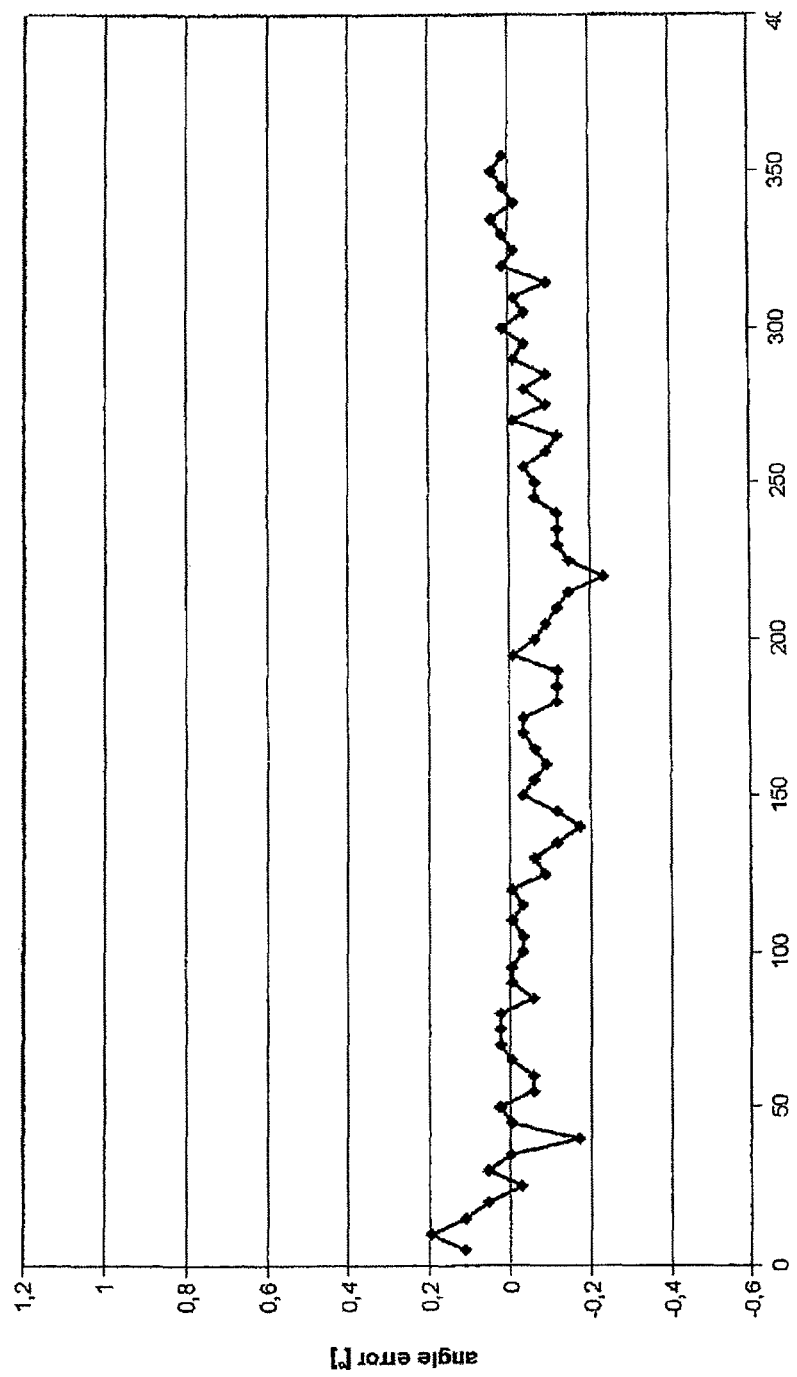
FIG. 7 shows a graphical representation similar to FIG. 5, however, the measuring point of the sensor system being situated on the magnetic rotation axis.

The first and second magnetic field components are now measured, and the angle between sensor system 2 and the magnetic field or the magnetic rotation axis is determined in the signal processor from the digital signals for the first and second magnetic field components, with the aid of an arcus tangens function. Any changes in the measured magnetic field components which may occur due to temperature fluctuations may be compensated with the aid of the temperature signal provided by temperature sensor 14. The measured angle values are output at an angle signal output 16 of the semiconductor chip in the form of an angle measuring signal. A comparison of FIG. 7 and FIG. 5 shows that the angle error is now substantially smaller than before the adjustment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An angle sensor for determining an angle between a sensor system and a magnetic field, the angle sensor comprising:
    a magnet that is adjustable in different rotational positions relative to the sensor system with regard to a rotation axis;
    a first magnetic field sensor configured to detect a first magnetic field component, which is oriented transversely to the rotation axis;
    a second magnetic field sensor configured to detect a second magnetic field component, which is oriented transversely to a plane extending from the rotation axis and the first magnetic field component, the second magnetic field sensor intersecting at a right angle with the first magnetic field sensor; and
    a third magnetic field sensor configured to detect a third magnetic field component, which is oriented in the direction of the rotation axis, the third magnetic filed sensor positioned adjacent to an intersection of the first and second magnetic field sensors,
    wherein said third magnetic field component is substantially constant during rotational movement of the magnetic field.

2. The angle sensor according to claim 1, wherein the sensor system is integrated into a semiconductor substrate, the first magnetic field sensor and the second magnetic field sensor each having at least one vertical Hall plate situated transversely to the plane of the semiconductor substrate, and the third magnetic field sensor having at least one horizontal Hall plate situated parallel to the plane of the semiconductor substrate or on the plane of the semiconductor substrate.

3. The angle sensor according to claim 2, wherein the surface center of gravity of the at least one vertical Hall plate of the first magnetic field sensor coincides with the surface center of gravity of the at least one vertical Hall plate of the second magnetic field sensor.

4. The angle sensor according to claim 2, wherein the vertical Hall plate of the first magnetic field sensor penetrates the vertical Hall plate of the second magnetic field sensor.

5. The angle sensor according to claim 2, wherein the surface center of gravity of the horizontal Hall plate and the surface center of gravity of the vertical Hall plate of the first magnetic field sensor and/or of the second magnetic field sensor lie on top of each other if the extension plane of the semiconductor substrate is viewed from above.

6. The angle sensor according to claim 1, wherein the third magnetic field sensor has an analog measuring signal output for the third magnetic field component, a temperature sensor having an analog temperature signal output is situated on the semiconductor chip, and the measuring signal output and the temperature signal output may be alternately connected to an input of an analog/digital converter via a switching device.

7. The angle sensor according to claim 1, wherein the magnet is mounted via a bearing in a manner which enables it to rotate around the rotation axis relative to the sensor system, and wherein an adjusting apparatus is arranged between the bearing and the sensor system, with the aid of which the rotation axis is moved relative to the sensor system in the direction of the first magnetic field component and in the direction of the second magnetic field component.

8. A method for determining an angle between a sensor system and a magnetic field which is rotatable around a rotation axis relative to the sensor system, the sensor system being provided and the magnetic field being generated, the method comprising:
    obtaining a first measured value for a first magnetic field component which is oriented transversely to the rotation axis via a first magnetic sensor;
    obtaining a second measured value for detecting a second magnetic field component which is situated transversely to a plane extending from the rotation axis and the first magnetic field component via a second magnetic sensor, the second magnetic sensor intersecting at a right angle with the first magnetic sensor; and
    determining an angle between the sensor system and the magnetic field via the first and second measured values, wherein:
        a) a measuring signal for a third magnetic field component oriented in the direction of the rotation axis is ascertained as a function of the rotational position, the third magnetic field component being determined by a third magnetic sensor positioned adjacent to an intersection of the first and second magnetic sensors;
        b) a fluctuation in the measuring signal is ascertained and compared with a setpoint value or a setpoint value range;
        c) in the event that the fluctuation does not match the setpoint value or the setpoint value range,
            i) the sensor system is moved relative to the magnetic field transversely to the rotation axis;
            ii) and steps a) through c) are then repeated;
        d) and in the event that the fluctuation matches the setpoint value or the setpoint value range, the first and second measured values are detected, and the angle between the sensor system and the magnetic field is determined with the aid of the measured values.

9. The method according to claim 8, wherein, for a first relative position between the rotation axis and the sensor system, a measuring signal for the third magnetic field component is detected as a function of the rotational position, and the fluctuation of the first measuring signal is ascertained; wherein, in a first direction, the sensor system is positioned relative to the rotation axis and placed in a further relative position between the rotation axis and the sensor system; wherein a further measuring signal for the third magnetic field component is detected as a function of the rotational position, and the fluctuation of this measuring signal is ascertained, for the further relative position; wherein the change between the fluctuation in the measuring signal last detected and the fluctuation in the previously detected measuring signal is determined; wherein steps b), c) and d) are repeated until the change in the fluctuation changes its sign or is equal to zero; and wherein steps a) through d) are then carried out in such a way that the movement in step c) i) takes place in a second direction which is oriented at right angles to the first direction and at right angles to the rotation axis.

10. The method according to claim 8, wherein the first magnetic field component and the second magnetic field component lie on a plane situated normally to the rotation axis and are oriented at substantially right angles to each other.

11. The angle sensor according to claim 1, wherein the third magnetic field sensor is arranged between the magnet and the first and second magnetic field sensors.

12. The angle sensor according to claim 1, wherein the third magnetic field sensor is arranged perpendicular to the rotation axis.

13. The angle sensor according to claim 1, wherein the first magnetic sensor and the second magnetic sensor are arranged in a same plane in a substrate.

14. An angle sensor comprising:
- a magnet that is rotatable about a rotation axis, the magnet having poles on a circumference of the magnet, the circumference being in a plane that is perpendicular to the rotation axis;
- a first magnetic field sensor arranged vertically with respect to the rotation axis, the first magnetic field sensor detecting a first magnetic field component from the magnet;
- a second magnetic field sensor arranged vertically with respect to the rotation axis and intersecting at a right angle to with the first magnetic field sensor, the second magnetic field sensor detecting a second magnetic field component from the magnet; and
- a third magnetic field sensor arranged perpendicularly with respect to the rotation axis and arranged between the magnet and the first or second magnetic field sensors, the third magnetic field sensor detecting a third magnetic field component from the magnet the third magnetic filed sensor positioned adjacent to an intersection of the first and second magnetic field sensors.

15. The angle sensor according to claim 14, wherein, based on the first magnetic field component and the second magnetic field component, an angle is determined, and wherein, based on the third magnetic field component, a distance between the third magnetic field sensor and the magnet is determined.

16. The angle sensor according to claim 15, wherein, based on the determined distance, a position of the first magnetic field sensor and the second magnetic field sensor is utilized to adjust a calculation of the angle.

17. The angle sensor according to claim 14, wherein the first magnetic field sensor, the second magnetic field sensor, and the third magnetic field sensor are arranged within a substrate.

18. The angle sensor according to claim 16, wherein centers of the first and second magnetic field sensors penetrate each other.

* * * * *